3,045,030
FLUORINATED ANDROSTANES AND INTERMEDIATES RELATING THERETO

Cecil H. Robinson, Cedar Grove, and Eugene P. Oliveto, Glen Ridge, N.J., assignors to Schering Corporation, Bloomfield, N.J., a corporation of New Jersey
No Drawing. Filed Nov. 24, 1961, Ser. No. 154,878
1 Claim. (Cl. 260—397.1)

This invention relates to novel, therapeutically active steroids of the androstane series. More specifically, this invention relates to 16,16-difluoroandrostanes which are saturated in the A-ring and have an oxygen function at C–17. In particular, our invention encompasses 16,16-difluoro derivatives of androsterones and of androstanediol-3α,17β as well as the 16,16-difluoro-17α-alkyl and 16,16-difluoro-17α-alkynyl derivatives of the aforementioned androstanediol, including intermediates in the prepartion thereof.

Our novel 16,16-difluoroandrostanes have the following general formula:

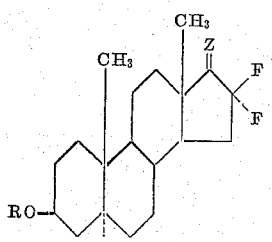

wherein Z is a member of the group consisting of O (H, βOR'), (α-lower alkyl, βOR') and (α-lower alkynyl, βOR') wherein R and R' are members of the group consisting of H and an acyl radical of a hydrocarbon carboxylic acid containing up to eight carbon atoms. R and R' may be alike or different.

Our invention therefore includes novel compounds such as 16,16-difluoroandrostane-3α-ol-17-one (16,16-difluoroandrosterone), 16,16 - difluoroandrostane - 3α,17β-diol (16,16-difluoroandrostanediol-3α,17β), 16,16-difluoro - 17α - methylandrostane - 3α,17β-diol, 16,16-difluoro-17α - ethinylandrostane-3α,17β-diol, and the lower alkanoate esters thereof.

By lower alkyl is contemplated hydrocarbon radicals having up to four carbon atoms and includes methyl, ethyl, n-propyl, isopropyl, n-butyl and the like.

By lower alkynyl is contemplated hydrocarbon radicals having up to four carbon atoms possessing a triple-bond stemming from the carbon attached to the 17-carbon of the steroid nucleus. Included in this group are radicals such as ethinyl, 1-propynyl and 1-butynyl.

The acyl radicals of hydrocarbon carboxylic acids containing up to eight carbon atoms are preferably radicals of lower alkanoic acids such as acetic, propionic, valeric, butyric, caproic acid and the like.

The novel 16,16-difluoroandrostanes of the general formula are therapeutically valuable in that they cause a reduction in serum cholesterol. This property renders our novel compounds valuable in the treatment and prevention of diseases which are accompanied by an increase in serum cholesterol, particularly, for example, in the treatment of atherosclerosis.

The preferred species of the therapeutically active 16,16-difluoroandrostanes of the general formula as described hereinabove is 16,16-difluoroandrostane-3α-ol-17-one, which is useful as an intermediate for preparing the other 16,16-difluoro compounds of this invention as well as being therapeutically active per se.

Our novel compounds are conveniently prepared from androsterone (androstane-3α-ol-17-one) by utilizing the novel process described in the copending application of Robinson, Serial No. 7,107, filed February 8, 1960. According to this process, androsterone is converted to the intermediary 16-hydroxymethylene-(tautomeric to 16-formyl) or 16 - (1'-hydroxy-1'-carbethoxy)-methylene-(tautomeric to 16 - ethoxalyl) androsterone by methods well known in the art. We prefer to formylate the activated C–16 position by reacting androsterone with ethyl formate and sodium methoxide or sodium hydride utilizing as solvent, benzene or tetrahydrofuran or mixtures thereof. The 16-formyl derivative thereby obtained apparently exists in two tautomeric forms (keto and enol), namely formyl and hydroxymethylene. Alternately, the 16-ethoxalyl derivative of androsterone is prepared according o procedures similar to those for preparing the 16-hydroxymethylene derivatives by using ethyl oxalate as reagent instead of ethyl formate. The 16-ethoxalyl derivative thereby obtained also exists in two tautomeric forms (keto and enol), namely 16-ethoxalylandrosterone (keto) and 16-(1'-hydroxy-1'-carbethoxy)-methyleneandrosterone (enol).

By reacting the intermediary 16-hydroxymethyleneandrosterone (16 - formylandrosterone) or 16 - (1'-hydroxy-1'-carbethoxy)methyleneandrosterone (16 - ethoxalylandrosterone) with perchloryl fluoride in the presence of alkoxide, preferably potassium t-butoxide in t-butanol solvent, there is obtained 16,16 - difluoroandrosterone a novel compound of our invention.

The compound 16,16-difluoroandrosterone, prepared as described above, may be transformed to the 17α-lower alkynyl-17β-hydroxy- or 17α-lower alkyl-17β-hydroxy analogs by known methods. For example, 16,16-difluoroandrosterone is readily transformed to 16,16-difluoro-17α-methylandrostane-3α-17β-diol by the well known Grignard reaction utilizing methyl magnesium iodide, or to the corresponding 17α-ethinyl derivative by means of sodium or potassium acetylide. The 17hydroxy compound, i.e., 16,16-difluoroandrostane-3α,17β-diol is conveniently obtained from the 17-keto analog by reduction with lithium aluminum hydride, sodium borohydride, platinum and hydrogen, and the like.

By substituting suitable reagents in the aforementioned reactions, such as ethyl magnesium bromide instead of methyl magnesium iodide in the Grignard reaction on 16,16-difluoroandrosterone, there are obtained higher alkyl homologs at C–17 for example, 16,16-difluoro-17α-ethylandrosterone-17β-ol. In preparing higher C–17 homologs of 16,16-difluoro-17α-ethinylandrosterone-17β-ol, it is preferred to alkylate the active hydrogen on the ethinyl moiety by means of lithium and methyl iodide, for example, to obtain 16,16-difluoro-17α-(1'-propynyl)-androstane-3α,17β-diol. When ethyl iodide and lithium are reacted with the aforementioned 17α-ethinyl derivatives there is obtained the corresponding 17α - butynyl compound, i.e., 16,16-difluoro-17α-(1'-butynyl)-androstane-3α,17β-diol.

Alternatively, our 16,16-difluoroandrostanes may be prepared from 16,16-difluoro-5-androstenes. For example, 16,16-difluoro-5-androstene-3β-ol-17-one prepared as described in copending application, Serial No. 7,107 filed February 8, 1960, from 16-hydroxymethylene-5-androstene-3β-ol-17-one and perchloryl fluoride upon hydrogenation in ethyl acetate utilizing platinum oxide as catalyst yields 16,16-difluoroandrostane-3β-ol-17-one. Conversion of the 3β-hydroxyl group to the 3-keto is effected by a chromic acid oxidation to give 16,16-difluoroandrostane-3,17-dione. Alternatively, esterification of the 3β-hydroxyl group with p-toluenesulfonic acid in pyridine, for example, gives 16,16-difluoroandrostane-3β-ol-17-one 3-tosylate. Displacement of the 3β-tosylate by sodium acetate using known techniques to give the corresponding 3α-acetoxy-16,16-difluoroandrostane-17-one followed by hydrolysis with ethanolic potassium hydroxide yields 16,16-difluoroandrostane-3α-ol-17-one of our invention. In like manner, utilizing similar techniques other 16,16-difluoro-5-androstenes described in copending application, Serial No, 7,107 filed February 8, 1960, such as 16,16-difluoro - 17α - methyl - 5 - androstene - 3β,17β - diol are convertible to the corresponding 16,16-difluoroandrostanes of this invention, e.g. 16,16-difluoro-17α-methylandrostane-3α,17β-diol.

The 3α-hydroxy-16,16-difluoroandrostanes of the general formula possessing an ester group at 17, are conveniently prepared by known techniques from the corresponding 17-hydroxy-16,16-difluoroandrostane by selective esterfication at C–17 with pyridine and a lower alkanoyl anhydride. For example, 16,16 - difluoroandrostane - 3α, 17β-diol reacted with approximately a molar equivalent of acetic anhydride in pyridine yields the 17-monoacetate, i.e. 16,16-difluoroandrostane-3α,17β-diol 17-acetate. By substituting other lower alkanoyl anhydrides such as propionyl anhydride or caproic anhydride, the corresponding 17-lower alkanoate is obtained, i.e. the 17-propionate and 17-caproate respectively of 16,16-difluoroandrostane-3α, 17β-diol.

When preparing 3,17-diesters of the general formula, the corresponding 3,17-diol is preferably reacted in pyridine with at least two moles of acid anhydride per mole of steroid. Usually an excess of acid anhydride is used, and it is often desirable to apply heat to hasten the esterification process.

The following examples are shown by way of illustration only and are not to be construed as limiting the scope of our invention, the scope of our invention being defined by the appended claim.

The present application is a continuation-in-part of our co-pending application, Serial No. 7,116, filed February 8, 1960.

EXAMPLE 1

16,16-Difluoroandrostane-3α-Ol-17-One

A. *16 - hydroxymethyleneandrostane - 3α - ol - 17-one.*—To a solution of one gram of androsterone in 20 ml. of tetrahydrofuran is added one gram of sodium methoxide. While the reaction is stirred under an atmosphere of nitrogen, 8 ml. of ethyl formate is added dropwise over a 30 minute period. The reaction mixture is then stirred under nitrogen 18 hours at room temperature. Ice and water (150 ml.) is added to give a yellow solution which is stirred and neutralized by the dropwise addition of concentrated hydrochloric acid. A solid precipitates which is filtered, washed with water and dried in vacuo to give 16-hydroxymethyleneandrostane-3α-ol-17-one, $$\lambda_{max.}^{MeOH}\ 265\ m\mu\ (\epsilon\ 9,100)$$

B. *16,16 - difluoroandrostane - 3α - ol - 17 - one.*—To a solution of one gram of 16-hydroxymethyleneandrostane-3α-ol-17-one in 150 ml. of t-butanol is added 20 ml. of a one molar solution of potassium in t-butanol. Perchloryl fluoride gas is bubbled through the solution at room temperature for 90 minutes. The reaction mixture is then diluted with 500 ml. of water and extracted with methylene chloride. The extracts are combined, washed with water and evaporated to a residue which is chromatographed on Florisil. The hexane-ether (1:1) eluates are combined and evaporated in vauco to give a residue which is crystallized from hexane-ether to give 16,16-difluoroandrostane-3α-ol-17-one, M.P. 133–136° C., $[\alpha]_D$ +102°.

EXAMPLE 2

16,16-Difluoro-17α-Ethinylandrostane-3α,17β-Diol

A 6.5 ml. portion of a 17% suspension of sodium acetylide in xylene is centrifuged and the supernatant liquid removed and replaced by 15 ml. of dimethylsulfoxide. The resultant suspension is added to a stirred solution of one gram of 16,16-difluoroandrostane-3α-ol-17-one in 100 ml. of dimethylsulfoxide at room temperature. The reaction mixture is stirred at room temperature for 30 minutes, then water and ice are added. A solid separates which is filtered, washed with water, dried and crystallized from acetone-hexane to give 16,16-difluoro-17α-ethinylandrostane-3α,17β-diol.

In a similar manner, by substituting sodium methyl acetylide for sodium acetylide in the above procedure, there is obtained 16,16-difluoro-17α-(1-propynyl)-androstane-3α,17β-diol.

EXAMPLE 3

16,16-Difluoro-17α-Methylandrostane-3α,17β-Diol

To a stirred solution of methyl magnesium iodide (prepared from 3 g. of magnesium and 7.5 ml. of methyl iodide) in 250 ml. of anhydrous ether is added dropwise with stirring one gram of 16,16-difluoroandrostane-3α-ol-17-one (the compound of Example 1) in 50 ml. of tetrahydrofuran. 150 ml. more of tetrahydrofuran is added and the mixture is distilled until 250 ml. of distillate is collected. The reaction mixture is refluxed for one hour longer, then cooled and diluted with ice-cold 10% aqueous aluminum sulfate solution. A solid separates which is filtered, washed with water, dried and chromatographed on Florisil. Hexane-ether (1:1) eluates are combined and evaporated in vacuo to give 16,16-difluoro-17α-methylandrostane-3α,17β-diol.

In a similar manner, by substituting other alkyl Grignard reagents such as ethyl magnesium iodide and n-propyl magnesium bromide for methyl magnesium iodide in the above procedure, there is obtained 16,16-difluoro-17α-ethylandrostane-3α,17β-diol and 16,16-difluoro-17α-n-propylandrostane-3α,17β-diol, respectively.

EXAMPLE 4

16,16-Difluoroandrostane-3α,17β-Diol 500 mg. of 16,16-difluoroandrostane-3α-ol-17-one (the compound of Example 1) is dissolved in 50 ml. of isopropanol to which is added 900 mg. of sodium borohydride. The solution is heated on the steam bath for one hour, then cooled and diluted with 150 ml. of water. A solid precipitates which is filtered, washed with water, dried and crystallized from aqueous methanol to give 16,16-difluoroandrostane-3α,17β-diol.

EXAMPLE 5

16,16-Difluoroandrostane-3α,17β-Diol 17-Acetate

To 3.28 g. of 16,16-difluoroandrostane-3α,17β-diol (the compound of Example 4) in 24 ml. of pyridine is added 1.03 ml. of acetic anhydride. The solution is left at room temperature for eight hours, then diluted with water. A solid separates which is filtered, washed with water and dried to give 16,16-difluoroandrostane-3α,17β-diol 17-acetate.

By substituting other lower alkanoic acid anhydrides such as propionic or caproic for acetic anhydride in the above procedure there is obtained the corresponding 17-propionate or 17-caproate respectively of 16,16-difluoroandrostane-3α,17β-diol.

EXAMPLE 6

Alternate Method of Preparing 16,16-Difluoroandrostane-3α-Ol-17-One   16-(1'-Hydroxy-1'-Carbethoxy)Methyleneandrosterone A. *(16-ethoxalylandrostane-3α-ol-17-one).*—To a stirred solution of 10 g. of sodium methoxide in 60 ml. of ethyl oxalate and 60 ml. of benzene under an atmosphere of nitrogen there is added dropwise a solution containing 10 g. of androstane-3α-ol-17-one in 5 ml. of benzene and 100 ml. of tetrahydrofuran. The reaction mixture is stirred under nitrogen at room temperature for 18 hours. The mixture is then filtered, poured into 350 ml. of water with stirring and neutralized with 6 N hydrochloric acid. A solid separates which is filtered, washed with water and dried to give 16-(1'-hydroxy-1'-carbethoxy)methyleneandrosterone (16-ethoxalylandrostane-3α-ol-17-one) which is used without further purification in the following procedure.

B. *16,16-difluoroandrostane-3α-ol-17-one (16-(1'-hydroxy - 1' - carbethoxy)methyleneandrosterone).*—(16-ethoxalylandrostane-3α-ol-17-one) is reacted with perchloryl fluoride in t-butanol in the presence of potassium t-butoxide in the manner described in Example 1B. The resultant product is isolated and purified as described to give 16,16-di-fluoroandrostane-3α-ol-17-one.

EXAMPLE 7

*16,16-Difluoroandrostane-3α-Ol-17-One 3-Acetate*

To 3.28 g. of 16,16-difluoroandrostane-3α-ol-17-one (the compound of Example 1) in 24 ml. of pyridine is added 1.03 ml. of acetic anhydride. The solution is heated on a steam bath for one hour then diluted with water. A solid separates which is filtered, washed with water, dried and recrystallized from acetone-hexane to give 16,16-difluoroandrostane-3α-ol-17-one 3-acetate.

In a similar manner, by substituting other lower alkanoic acid anhydrides such as propionic or valeric for acetic anhydride in the above procedure there is obtained the corresponding 3-propionate and 3-valerate, respectively of 16,16-difluoroandrostane-3α-ol-17-one.

EXAMPLE 8

*16,16-Difluoroandrostane-3α,17β-Diol Diacetate*

To 3.28 g. of 16,16-difluoroandrostane-3α,17β-diol (the compound of Example 4) in 50 ml. of pyridine is added 2.5 ml. of acetic anhydride. The solution is heated on the steam bath for one hour then diluted with water. A solid separates which is filtered, washed with water, dired and recrystallized from acetone-hexane to give 16,16-difluoroandrostane-3α,17β-diol diacetate.

In a similar manner, by substituting other lower alkanoic acid anhydrides such as propionic or valeric for acetic anhydride in the above procedure there is obtained the corresponding 3,17-dipropionate and 3,17-divalerate respectively of 16,16-difluoroandrostane-3α,17β-diol.

We claim:

16-(1'-hydroxy-1'-carbethoxy)methyleneandrosterone.

No references cited.